United States Patent
Lee et al.

(10) Patent No.: US 8,929,227 B2
(45) Date of Patent: Jan. 6, 2015

(54) METHOD AND APPARATUS FOR CONTROLLING UPLINK TRANSMISSION POWER IN WIRELESS COMMUNICATION SYSTEM

(75) Inventors: Neung-Hyung Lee, Seongnam-si (KR); Nam-Hoon Kim, Suwon-si (KR); Jae-Ho Jeon, Seongnam-si (KR); Seung-Joo Maeng, Seongnam-si (KR); Seung-Hyun Min, Seoul (KR); Sung-Soo Hwang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 63 days.

(21) Appl. No.: 13/342,472

(22) Filed: Jan. 3, 2012

(65) Prior Publication Data

US 2012/0176915 A1    Jul. 12, 2012

(30) Foreign Application Priority Data

Jan. 7, 2011    (KR) .................. 10-2011-0001706

(51) Int. Cl.
*H04W 52/16*    (2009.01)
*H04W 52/14*    (2009.01)
*H04W 52/24*    (2009.01)

(52) U.S. Cl.
CPC .......... *H04W 52/146* (2013.01); *H04W 52/241* (2013.01); *Y02B 60/50* (2013.01)
USPC ....................................... 370/248; 455/127.2

(58) Field of Classification Search
USPC ............... 370/241–245, 248, 252; 455/127.2, 455/452.1, 522
See application file for complete search history.

(56) References Cited

U.S. PATENT DOCUMENTS

| | | | |
|---|---|---|---|
| 2005/0208961 A1* | 9/2005 | Willenegger | 455/522 |
| 2006/0245397 A1* | 11/2006 | Zhang | 370/335 |
| 2008/0280638 A1* | 11/2008 | Malladi et al. | 455/522 |
| 2009/0175187 A1* | 7/2009 | Jersenius et al. | 370/252 |
| 2009/0190485 A1* | 7/2009 | Bjorkegren et al. | 370/252 |
| 2009/0286545 A1* | 11/2009 | Yavuz et al. | 455/452.1 |
| 2011/0105061 A1* | 5/2011 | Yu et al. | 455/127.2 |
| 2012/0282970 A1* | 11/2012 | Kela et al. | 455/522 |

* cited by examiner

*Primary Examiner* — Brian D Nguyen
(74) *Attorney, Agent, or Firm* — Jefferson IP Law, LLP

(57) ABSTRACT

A method for controlling uplink transmission power in a wireless communication system is provided. The method includes estimating a downlink path loss, determining a target Signal to Noise Ratio (SNR) depending on the downlink path loss, determining an amount of power to compensate for a difference between the target SNR and an estimated SNR, and transmitting a power control message including a Transmit Power Control (TPC) command value to a terminal based on the determined amount of power.

18 Claims, 4 Drawing Sheets

METHOD AND APPARATUS FOR CONTROLLING UPLINK TRANSMISSION POWER IN WIRELESS COMMUNICATION SYSTEM

PRIORITY

This application claims the benefit under 35 U.S.C. §119 (a) of a Korean patent application filed in the Korean Intellectual Property Office on Jan. 7, 2011 and assigned Serial No. 10-2011-0001706, the entire disclosure of which is hereby incorporated by reference.

BACKGROUND OF THE INVENTION

1. Field of the Invention

The present invention relates to a wireless communication system. More particularly, the present invention relates to a method and an apparatus for controlling uplink transmission power in a wireless communication system.

2. Description of the Related Art

A wireless communication system provides various kinds of communication services, such as voice and data. Generally, a wireless communication system is a multiple access system that can share available system resources (bandwidth, transmission power, etc.) and support communication with multiple users. Examples of the multiple access system include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, etc.

A wireless communication system needs to control uplink transmission power in order to efficiently use limited radio resources. This is for controlling a size of a reception signal at a base station to an appropriate level. That is, when transmission power is too weak in uplink transmission, the base station cannot receive a transmission signal of a terminal. In contrast, when the transmission power is too strong, a transmission signal of the terminal may act as interference to a transmission signal of a different terminal, and increases battery consumption of the terminal. The wireless communication system controls uplink transmission power to maintain the size of a reception signal at an appropriate level, thereby preventing unnecessary power consumption at a terminal. In addition, the wireless communication system adaptively determines a data transmission rate, etc., thereby improving transmission efficiency.

The uplink transmission power control is roughly classified into an open loop power control and a closed loop power control. The open loop power control measures or estimates signal attenuation of a downlink to estimate signal attenuation of an uplink and compensate for transmission power of the uplink, and determines uplink power with consideration of an amount of radio resources allocated to a relevant terminal or the attribute of transmission data. In the closed loop power control, a base station and a terminal cooperate using feedback information for a transmission power control to control transmission power.

To control transmission power between a base station and a terminal, a Transmit Power Control (TPC) command is used. In the Wideband CDMA (WCDMA) system of the related art, a TPC command is used for both an uplink and a downlink transmission wherein one of a plurality of TPC command values is transmitted. For example, in a $3^{rd}$ Generation Partnership Project (3GPP) standard, one of four values of −1, 0, +1, +3 dB is transmitted as a TPC command.

Therefore, a need exists for a method and an apparatus for efficiently determining a TPC command for controlling uplink transmission power in a wireless communication system.

SUMMARY OF THE INVENTION

Aspects of the present invention are to address at least the above-mentioned problems and/or disadvantages and to provide at least the advantages described below. Accordingly, an aspect of the present invention is to provide a method and an apparatus for controlling uplink transmission power in a wireless communication system.

Another aspect of the present invention is to provide a method and an apparatus for determining a Transmit Power Control (TPC) command value in a wireless communication system.

In accordance with an aspect of the present invention, a method for controlling uplink transmission power in a wireless communication system is provided. The method includes estimating a downlink path loss, determining a target Signal to Noise Ratio (SNR) depending on the downlink path loss, determining an amount of power to compensate for a difference between the target SNR and an estimated SNR, and transmitting a power control message including a TPC command value to a terminal based on the determined amount of power.

In accordance with another aspect of the present invention, an apparatus for controlling uplink transmission power in a wireless communication system is provided. The apparatus includes a controller for estimating a downlink path loss, and for determining a target SNR depending on the downlink path loss, a power control determining unit for determining an amount of power to compensate for a difference between the target SNR and an estimated SNR, and a transmitter for transmitting a power control message including a TPC command value based on the determined amount of power.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

Figure 1:
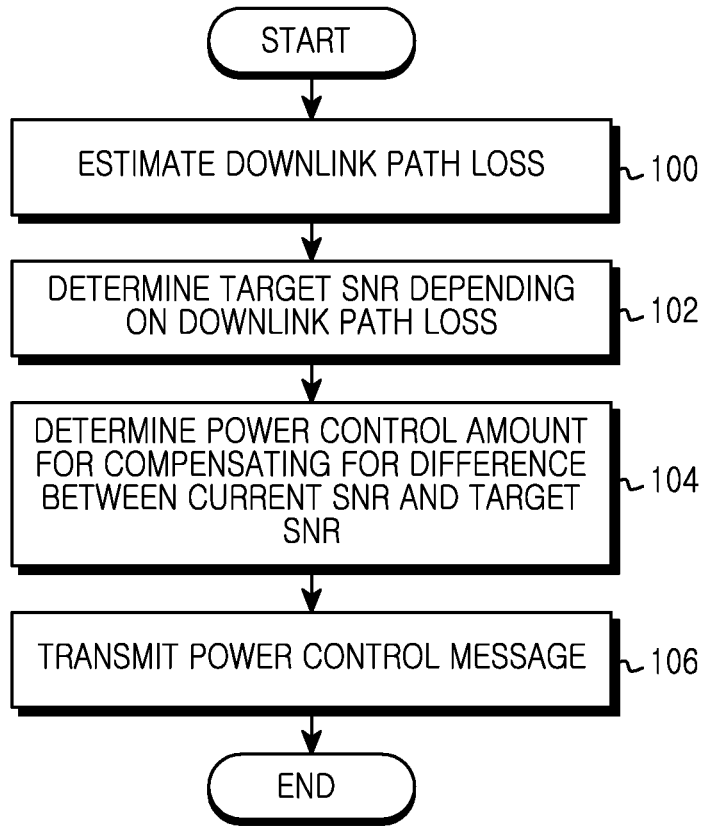
FIG. 1 is a flowchart for controlling uplink transmission power in a wireless communication system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide a method and an apparatus for controlling uplink transmission power in a wireless communication system Though the present invention is described using a Long Term Evolution (LTE) system as an example, it is applicable to other wireless communication systems.

FIGS. 1 through 4, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

FIG. 1 is a flowchart for controlling uplink transmission power in a wireless communication system according to an exemplary embodiment of the present invention.

Referring to FIG. 1, a base station estimates a downlink path loss of a terminal in step 100.

The downlink path loss of the terminal is estimated via a Sounding Reference Signal (SRS) transmitted by the terminal and a Power Headroom Report (PHR) reported by the terminal. The path loss is expressed by Equation (1). The PHR is information of a residual amount of power and informs of an amount of power that can be additionally used by the terminal That is, the information of the residual amount of power denotes a difference between the maximum amount of power that can be transmitted by the terminal and the amount of power that is currently transmitted by the terminal That is, the terminal informs the base station of the residual power information so that the base station may not allocate an amount of a radio resource exceeding the capability of the terminal to the specific terminal.

$$\text{Pathloss\_dB} = Tx\_\text{power\_dB} - Rx\_\text{power\_dB} + \text{offset\_DL\_UL} \tag{1}$$

In Equation (1), Pathloss_dB is a value representing a downlink path loss in unit of dB, Tx_power_dB is a value representing transmission power per Resource Block (RB) of a terminal in unit of dB, and Rx_power_dB is a value representing reception power of a base station in unit of dB. Since a path loss calculated using a difference between Tx_power_dB and Rx_power_dB is an uplink power loss, offset_DL_UL is added to convert the uplink path loss into a downlink path loss. In Equation (1), Tx_power_dB is calculated via PHR (refer to Equation (2)), and Rx_power_dB is calculated via SRS (refer to Equation (3)).

$$Tx\_\text{power\_dB} = 23 - (\text{PHR\_index} - 23) - 10 * \log 10(\text{PHR\_RB}) \tag{2}$$

In Equation (2), PHR_index is an index of a PHR value transferred as a PHR message, and a value obtained by subtracting 23 from the index is an actual PHR value. A value obtained by subtracting the actual PHR from 23 dBm is transmission power of a terminal, and the number of RB (PHR_RB) during PHR transmission is converted in units of dB and subtracted in order to convert the transmission power of the terminal into power for each RB.

Rx_power_dB may be calculated through two methods.

A first method is a method for calculating Rx_power_dB using Equation (3) via a Signal to Noise Ratio (SNR) based on a received SRS.

$$Rx\_\text{power\_dB} = \text{est\_SNR\_dB} + NI\_dB \tag{3}$$

In Equation (3), est_SNR_dB is an SNR value estimated via a received SRS. est_SNR_dB may be calculated via a different factor other than an SRS. For example, est_SNR_dB may be measured via Demodulation (DM) RS (for example, a pilot signal) existing in a Physical Uplink Shared Channel (PUSCH). NI_dB is a noise and interference component. A measured value or a constant is used for NI_dB.

A second method is a method for directly calculating Rx_power_dB via power of a received SRS (i.e., measure Received Signal Strength Indication/Indicator (RSSI)). That is, the second method is performed by averaging reception power for each subcarrier of an SRS using the number of subcarriers for SRS transmission.

Thereafter, the base station determines a target SNR based on an estimated downlink path loss in step 102. An exemplary method of setting the target SNR depending on the downlink path loss is described below.

An appropriate SNR of a terminal is set as a target SNR depending on a path loss of the terminal, and the target SNR is calculated using Equation (4) on the assumption that the terminal operates in an Open Loop Power Control (OLPC).

$$\text{Target\_SNR\_dB} = P_0 + (\alpha - 1) * \text{pathloss\_dB} - NI\_dB + \text{offset\_target} \tag{4}$$

In Equation (4), $P_0$ and $\alpha$ denote $P_{O\_PUSCH}(j)$ and $\alpha(j)$ which the base station transmits to a terminal. $P_{O\_PUSCH}(j)$ is a constant value that is constant for every cell and $\alpha(j)$ is a weight (0, 0.4, 0.5, 0.6, 0.7, 0.8, 0.9, 1.0) for compensating for a path loss. Here, when α=0, the terminal operates in an open loop. When α=1, the terminal operates in a closed loop.

pathloss_dB is an estimated downlink path loss, and NI_dB is a noise and interference component. offset_target is a parameter for correcting a target SNR according to a specific purpose. For example, offset_target is added for intercellular interference cancellation or Quality of Service (QoS) for each terminal That is, since a relevant terminal is positioned at the edge of a cell coverage area and so may cause a large interference to a neighbor cell, offset_target may be used for limiting transmission power of the terminal at this point. Alternatively, in the case where a required QoS level of the relevant terminal is high, offset_target is increased to raise transmission power of the relevant terminal. In the case where a required QoS level of the relevant terminal is low, offset_target is reduced to reduce transmission power of the relevant terminal.

Thereafter, the base station determines a Transmit Power Control (TPC)_amount in order to compensate for a difference between a current SNR and a target SNR in step 104. The TPC_amount is calculated using Equation (5).

$$TPC\_amount = Target\_SNR\_dB - est\_SNR\_dB \quad (5)$$

In Equation (5), Target SNR_dB is a calculated appropriate SNR, and est_SNR_dB is an SNR calculated by receiving an SRS or a DM RS of PUSCH.

Thereafter, the base station determines a TPC command value according to the TPC_amount and transmits a power control message including the TPC command value in step 106.

For example, one of four values of −1, 0, +1, +3 dB is transmitted as the TPC command. After the TPC command is transmitted, TPC_amount is updated by a relevant amount. When the updated TPC amount is smaller than −1 or greater than +1, the TPC command is further transmitted. The TPC command is calculated via the following process:

```
[TPC command calculation part]
If TPC_amount > +3
    TPC_command = +3 dB
Else if TPC_amount > +1
    TPC_command = +1 dB
Else if TPC_amount < −1
    TPC_command = −1 dB
[TPC command transmission part]
TPC_amount = TPC_amount − TPC_command
```

Meanwhile, the terminal determines uplink power depending on a TPC command value transmitted by the base station. For example, in the LTE system, a terminal calculates transmission power using Equation (6) depending on a downlink path loss of the terminal, and adds the TPC command transmitted by the base station to this calculated value to determine final transmission power.

$$P_{PUSCH}(i) = \min\{P_{CMAX}, 10\log_{10}(M_{PUSCH}(i)) + P_{O\_PUSCH}(j) + \alpha(j) \cdot PL + \Delta_{TF}(i) + f(i)\} \quad (6)$$

In Equation (6), $P_{PUSCH}(i)$ is transmission power of a terminal i and is determined using transmission power per RB and the number of transmitted RB. A maximum transmission power is limited to $P_{CMAX}$. More specifically, transmission power per RB of the terminal is determined via $P_{O\_PUSCH}(j)$ and α(j) transmitted by the base station. The base station transmits them together with the TPC command via a Physical Downlink Control Channel (PDCCH) allocated as a PUSCH by the base station in order to control power of the terminal. The terminal reflects them to f(i) to control transmission power. ΔTF(i) is a parameter for setting different power for each MCS.

Figure 2:
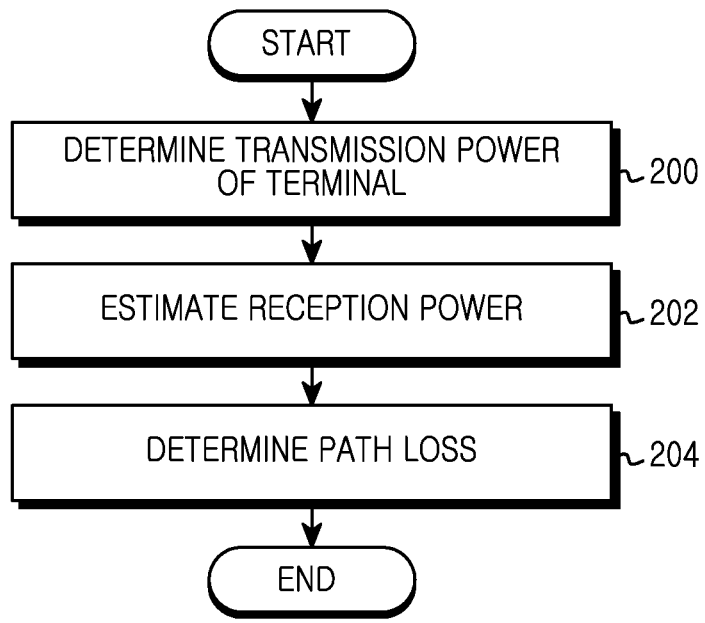
FIG. 2 is a flowchart for determining a downlink path loss of a terminal according to an exemplary embodiment of the present invention.

FIG. 2 is a flowchart for determining a downlink path loss of a terminal according to an exemplary embodiment of the present invention.

Referring to FIG. 2, a base station estimates transmission power via a PHR reported from the terminal in step 200. The PHR is residual power information and informs of an amount of power that can be additionally used by the terminal. That is, the residual power information denotes a difference between maximum power that can be transmitted by the terminal and power that is currently transmitted by the terminal.

Thereafter, the base station estimates an SNR based on an SRS transmitted by the terminal and estimates a reception signal using the estimated SNR of the SRS in step 202 (refer to Equation (3)). Depending on realization, the base station may measure an RSSI of the SRS to directly estimate a reception signal.

The base station determines a path loss using a difference between estimated transmission power and reception power of the terminal and an offset for converting an uplink path loss into a downlink path loss in step 204 (refer to Equation (1)).

Thereafter, the base station ends the algorithm according to an exemplary embodiment of the present invention.

Figure 3:
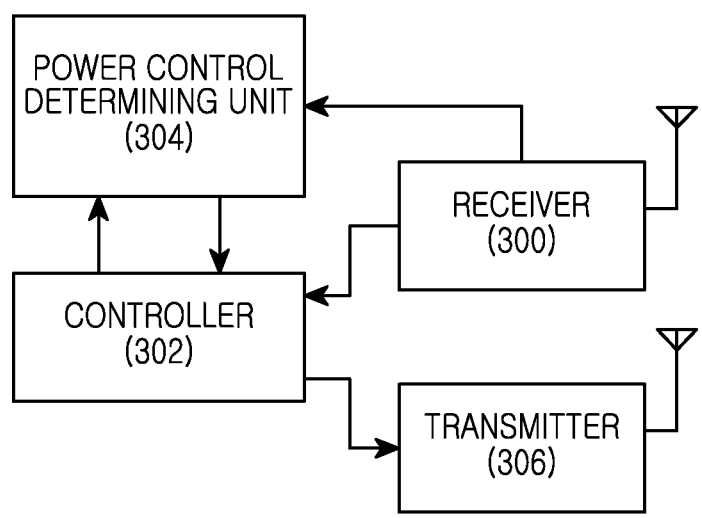
FIG. 3 is a block diagram illustrating an apparatus for controlling uplink transmission power in a wireless communication system according to an exemplary embodiment of the present invention.

FIG. 3 is a block diagram illustrating an apparatus for controlling uplink transmission power in a wireless communication system according to an exemplary embodiment of the present invention.

Referring to FIG. 3, the base station includes a receiver 300, a controller 302, a power control determining unit 304, and a transmitter 306.

The receiver 300 decodes a signal according to an Orthogonal Frequency Division Multiple (OFDM)/Orthogonal Frequency Division Multiple Access (OFDMA) scheme or a Single Carrier Frequency Division Multiple Access (SC-FDMA) scheme to provide the same to the controller 304. In addition, the receiver 300 estimates an SNR value based on an SRS or a pilot signal of received signal components to provide the same to the power control determining unit 304.

The controller 302 estimates a downlink path loss of a terminal based on relevant information (transmission power and reception power related information of the terminal, etc.) provided from the receiver 300. The downlink path loss of the terminal is estimated via an SRS transmitted by the terminal and a PHR reported by the terminal (refer to Equation (1)).

That is, the controller 302 may determine the transmission power of the terminal via the PHR reported by the terminal, and calculates the reception power using Equation (3) via an SNR based on the received SRS. Depending on realization, the controller 302 may directly estimate an RSSI via the power of the received SRS to determine the reception power.

In addition, the controller 302 determines a target SNR based on the estimated downlink path loss to provide the same to the power control determining unit 304. That is, the controller 302 sets an appropriate SNR of the terminal as a target SNR (refer to Equation (4)).

The power control determining unit 304 determines a TPC_amount in order to compensate for a difference between a current SNR from the receiver 300 and a target SNR from the controller 302. The TPC_amount is determined using Equation (5).

Meanwhile, the controller 302 determines a TPC command value depending on the TPC_amount from the power control determining unit 304, and transmits a power control message including the TPC command value. For example, one of four values of −1, 0, +1, +3 dB is transmitted as the TPC command.

After the TPC command is transmitted, TPC_amount is updated by a relevant amount. When the updated TPC amount is smaller than −1 or greater than +1, the TPC command is further transmitted.

Figure 4:
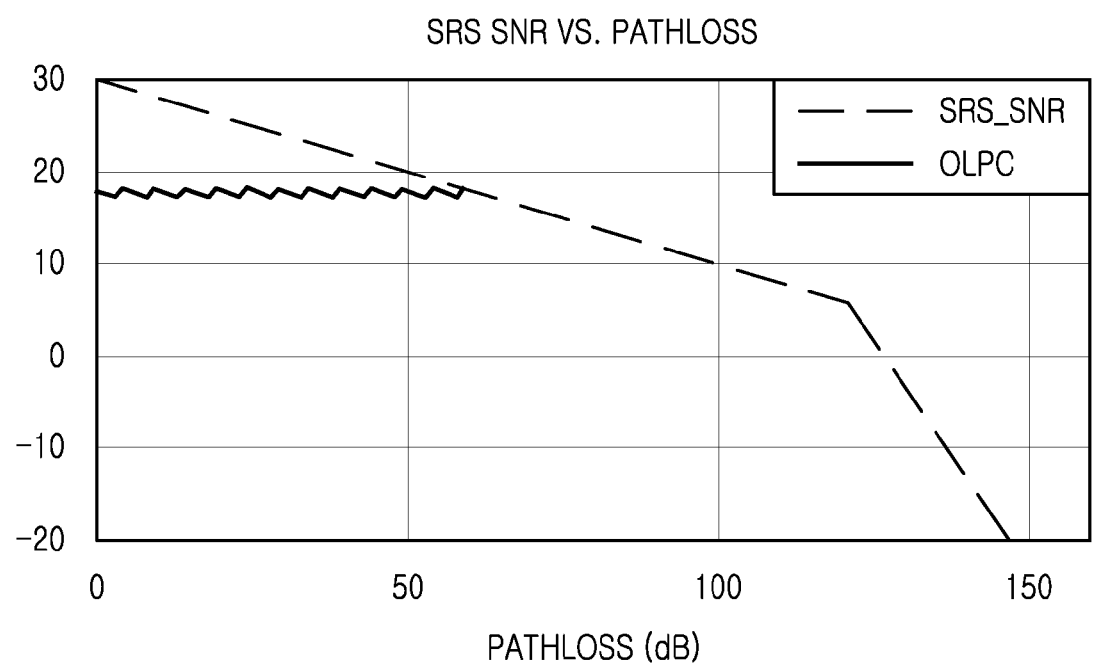
FIG. 4 is a simulation graph according to an exemplary embodiment of the present invention.

FIG. 4 is a simulation graph according to an exemplary embodiment of the present invention.

Referring to FIG. 4, the x-axis represents a path loss value, and the y-axis represents an SNR value of an SRS. FIG. 4 illustrates a target SNR value depending on a path loss of a terminal and an SNR value that can be obtained when a proposed method is applied. As set parameters, $P_0$ is set to −80 dBm, $\alpha$ is set to 0.8, NI_dB is set to −110, maximum Power Control (PCMAX) is set to 23 dBm, offset_DL_UL is set to 0 dB, and offset_target is set to 0 dB. An OLPC graph denotes a target SNR. A path loss curves downward in the neighborhood of 120 dB because this region is a point where the transmission power of the terminal is limited to 23 dBm. A proposed power control technique observes an OLPC well in most regions. An SNR is maintained in a region where a path loss is in the neighborhood of 60 dB or below because a range of a PHR transmitted by the terminal is limited. The PHR is a standard of the LTE standard and supports up to 40 dB at the maximum.

As described above, when a power control technique according to an exemplary embodiment is used, an appropriate SNR may be guaranteed depending on a path loss of the terminal. As an example of realization, the power control technique may be set to observe an operation of the OLPC.

As described above, a wireless communication system sets a target SNR depending on a downlink path loss of the terminal to determine a power control, thereby performing an efficient uplink transmission power control.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for controlling uplink transmission power in a wireless communication system, the method comprising:
estimating a downlink path loss based on an estimation of reception power according to a received reference signal from a terminal;
determining a target Signal to Noise Ratio (SNR) based on the downlink path loss;
determining a value to compensate for a difference between the target SNR and an estimated SNR; and
transmitting a power control message including a Transmit Power Control (TPC) command value to the terminal based on the determined value,
wherein the estimating of the downlink path loss comprises:
receiving residual power information from the terminal to determine transmission power of the terminal;
receiving the reference signal from the terminal to estimate the reception power; and
determining an uplink path loss based on a difference between the transmission power of the terminal and the reception power of the terminal.

2. The method of claim 1, further comprising:
converting the uplink path loss into the downlink path loss based on an offset.

3. The method of claim 1, wherein the reference signal comprises one of a sounding signal and a pilot signal.

4. The method of claim 1, wherein the receiving of the reference signal from the terminal to estimate the reception power comprises:
estimating a Signal to Noise Ratio (SNR) of the reference signal, and a noise and interference component; and
determining the reception power based on a difference between the SNR of the reference signal and the noise and interference component.

5. The method of claim 1, wherein the receiving of the reference signal from the terminal to estimate the reception power comprises:
determining reception power for each subcarrier of the reference signal to average the reception power of the reference signal.

6. The method of claim 1, wherein the target SNR based on the downlink path loss is determined based on the Equation below:

$$\text{Target\_SNR\_dB} = P_0 + (\alpha-1)*\text{pathloss\_dB} - \text{NI\_dB} + \text{offset\_target},$$

where $P_0$ and $\alpha$ denote $P_{O\_PUSCH}(j)$ and $\alpha(j)$ which the base station transmits to a terminal, $P_{O\_PUSCH}(j)$ is a constant value that is constant for every cell and $\alpha(j)$ is a weight for compensating for a path loss, wherein when $\alpha=0$, the terminal operates in an open loop, when $\alpha=1$, the terminal operates in a closed loop, pathloss_dB is an estimated downlink path loss, NI_dB is a noise and interference component, and offset_target is a parameter for compensating for the target SNR according to a specific purpose.

7. The method of claim 1, further comprising:
updating the value based on the TPC command value.

8. The method of claim 7, further comprising:
if the updated value is smaller than a first threshold or greater than a second threshold, transmitting the TPC command.

9. The method of claim 1, wherein, if the value is greater than +3, the TPC command value comprises +3 dB,
if the value is greater than +1, the TPC command value comprises +1 dB, and
if the value is less than −1, the TPC command value comprises −1 dB.

10. An apparatus for controlling uplink transmission power in a wireless communication system, the apparatus comprising:
a controller configured to estimate a downlink path loss based on an estimation of reception power according to a received reference signal from a terminal, and to determine a target Signal to Noise Ratio (SNR) based on the downlink path loss;
a power control determining unit configured to determine a value to compensate for a difference between the target SNR and an estimated SNR; and
a transmitter configured to transmit a power control message including a Transmit Power Control (TPC) command value based on the determined value,
wherein the controller receives residual power information from the terminal to determine transmission power of the terminal, receives the reference signal from the terminal to estimate the reception power, and determines an uplink path loss based on a difference between the transmission power of the terminal and the reception power of the terminal.

11. The apparatus of claim 10, wherein the controller converts the uplink path loss into the downlink path loss based on an offset.

12. The apparatus of claim 10, wherein the reference signal comprises one of a sounding signal and a pilot signal.

13. The apparatus of claim 10, wherein the controller estimates a Signal to Noise Ratio (SNR) of the reference signal, and a noise and interference component, and determines the reception power based on a difference between the SNR of the reference signal and the noise and interference component.

14. The apparatus of claim 10, wherein the controller determines reception power for each subcarrier of the reference signal to average the reception power of the reference signal.

15. The apparatus of claim 10, wherein the target SNR based on the downlink path loss is determined based on the Equation below:

$$\text{Target\_SNR\_dB} = P_0 + (\alpha-1)*\text{pathloss\_dB} - \text{NI\_dB} + \text{offset\_target},$$

where $P_0$ and $\alpha$ denote $P_{O\_PUSCH}(j)$ and $\alpha(j)$ which the base station transmits to a terminal, $P_{O\_PUSCH}(j)$ is a constant value that is constant for every cell and $\alpha(j)$ is a weight for compensating for a path loss, wherein when $\alpha=0$, the terminal operates in an open loop, when $\alpha=1$, the terminal operates in a closed loop, pathloss_dB is an estimated downlink path loss, NI_dB is a noise and interference component, and offset_target is a parameter for compensating for the target SNR according to a specific purpose.

16. The apparatus of claim 10, wherein the controller updates the value based on the TPC command value.

17. The apparatus of claim 16, wherein, if the updated value is smaller than a first threshold or greater than a second threshold, the controller transmits the TPC command.

18. The apparatus of claim 10, wherein, if the value is greater than +3, the TPC command value comprises +3 dB,
if the value is greater than +1, the TPC command value comprises +1 dB, and
if the value is less than −1, the TPC command value comprises −1 dB.

\* \* \* \* \*